United States Patent [19]

Inaba et al.

[11] Patent Number: 4,549,276
[45] Date of Patent: * Oct. 22, 1985

[54] INDUSTRIAL ROBOT CONTROL METHOD

[75] Inventors: Hajimu Inaba, Hino; Shinsuke Sakakibara, Komae, both of Japan

[73] Assignee: Fanuc Ltd., Minamitsuru, Japan

[*] Notice: The portion of the term of this patent subsequent to Sep. 24, 2002 has been disclaimed.

[21] Appl. No.: 491,426

[22] PCT Filed: Aug. 4, 1982

[86] PCT No.: PCT/JP82/00305
§ 371 Date: Mar. 25, 1983
§ 102(e) Date: Mar. 25, 1983

[87] PCT Pub. No.: WO83/00573
PCT Pub. Date: Feb. 17, 1983

[30] Foreign Application Priority Data

Aug. 4, 1981 [JP] Japan ................................ 56-122016

[51] Int. Cl.[4] ........................ G06F 15/46; G05B 19/42
[52] U.S. Cl. .................................... 364/513; 318/568; 364/474; 901/6
[58] Field of Search ........ 364/474, 475, 513, 167–171, 364/191–193; 318/568; 239/69, 70; 901/6–8, 43; 29/568

[56] References Cited

U.S. PATENT DOCUMENTS

| | | | |
|---|---|---|---|
| 3,909,922 | 10/1975 | Takasaki et al. | 29/568 |
| 4,092,719 | 5/1978 | Salmon | 364/468 |
| 4,187,454 | 2/1980 | Ito et al. | 318/568 |
| 4,348,623 | 9/1982 | Kobayashi et al. | 318/568 |
| 4,362,124 | 12/1982 | Fleig | 239/69 X |
| 4,396,987 | 8/1983 | Inaba et al. | 364/513 |

FOREIGN PATENT DOCUMENTS 48-6375  1/1973  Japan .
49-33091 3/1974  Japan .
2021287 11/1979 United Kingdom .

OTHER PUBLICATIONS

Yada–"Unmanned Machining Systems Using Robots'-'-Automation-vol. 17, No. 11, Nov. 1972-pp. 30-33.
Proceedings of the 4th International Symposium on Industrial Robots, "DNC System with Robot", Kobayashi et al., Nov. 19-21, 1974, pp. 455-464.

Primary Examiner—Joseph Ruggiero
Attorney, Agent, or Firm—Staas & Halsey

[57] ABSTRACT

An industrial robot control method for use in a system having a machine tool (MAC), a numerical control device (NCU) for controlling the machine tool, an industrial robot (RBT), and a robot control device (RCU) for controlling the industrial robot. In accordance with this industrial robot control method, a plurality of robot programs are stored beforehand in an internal memory (DMR) of the robot control device (RCU), and a plurality of NC programs are stored beforehand in an internal memory (DMN) of the numerical control device (NCU). The size or shape of a workpiece is sensed by a workpiece discriminating unit (WKD) to select the robot program conforming to the particular workpiece. An NC program number, corresponding to the robot program, is transmitted from the robot control device (RCU) to the numerical control device (NCU). The machine tool (MAC) is controlled in accordance with the NC program identified by NC program number, and the robot (RBT) is controlled based on the selected robot program.

10 Claims, 4 Drawing Figures

INDUSTRIAL ROBOT CONTROL METHOD

CROSS REFERENCE TO RELATED APPLICATION

This application is related to U.S. application Ser. No. 485,123, filed Mar. 25, 1983 and assigned to the assignee of the subject application.

BACKGROUND OF THE INVENTION

This invention relates to an industrial robot control method. More particularly, the invention relates to an industrial robot control method for use in a system having a machine tool, a numerical control device for controlling the machine tool, an industrial robot and a robot control device for controlling the industrial robot. A plurality of NC programs are stored in the numerical control device, and an NC program selection signal is generated by the robot control device to cause the numerical control device to execute numerical control processing based on the NC program corresponding to the selection signal.

As shown in FIG. 1, a system having a machine tool for subjecting a workpiece to predetermined machining and an industrial robot for servicing the machine tool (e.g., loading and unloading workpieces, changing tools and cleaning machining scraps), is provided with a numerical control device NCU for controlling the machine tool MAC and with a separate robot control device RCU for controlling the industrial robot RBT. The numerical control device NCU and the robot control device RCU possess respective internal memories MMN, MMR. The memory MMN stores an NC program in accordance with which the machine tool subjects the workpiece to predetermined machining, while the memory MMR stores a robot program comprising a number of items of robot command data for prescribing robot motion. Processors PRN, PRR located within the respective numerical and robot control devices NCU, RCU read the machining data and robot command data out of the corresponding memories MMN, MMR in sequential fashion and control the machine tool MAC and the industrial robot RBT on the basis of the machining data and robot command data, so that machining and robot services may be executed as commanded. In FIG. 1, TP denotes a paper tape bearing a punched machining program read into the memory MMN by a tape reader (not shown). TB represents a teaching box, MX, MZ designate motors for driving the machine tool, and CPN, CPR denote ROMs (read-only memories) which store the respective control programs.

In a conventional system, the same machining operation is performed continuously a considerable number of times. With the method of the prior art, therefore, only a single NC program, selected depending upon the kind of machining to be performed on the workpiece, is stored beforehand in the memory MMN, and the robot control device is pre-taught only a single robot program, with the desired NC machining operation and robot services being carried out based on the NC program and robot program. Then, whenever the predetermined number of machining opeations ends and a different machining operation is to be performed, activities are halted temporarily to load a different NC program and teach a different robot program.

While the foregoing prior-art method is suitable for performing the same machining and the same robot services continuously for, say, a full day, it is unfit for instances where the machining operation and robot services are required to be changed one after another. In other words, according to the conventional method, the operator must intercede to perform the loading and teaching tasks whenever the machining operations and robot services change. This results in markedly diminished efficiency and makes it impossible for the method to be applied to unmanned plants or the like.

SUMMARY OF THE INVENTION

In view of the foregoing, the object of the present invention is to provide an industrial robot control method which does not require the intervention of an operator to perform loading and teaching tasks each time a machining operation or robot service changes.

Another object of the present invention is to provide an industrial robot control method through which a predetermined NC program and robot control program are selected automatically in accordance with the size or shape of an unmachined workpiece. Then, NC machining and robot service processing are executed based on the selected programs.

A further object of the present invention is to provide an industrial robot control method through which successively changing machining operations and robot services can be performed automatically without operator intervention.

The present invention is directed to an industrial robot control method for use in a system having a machine tool, a numerical control device for controlling the machine tool, an industrial robot, and a robot control device for controlling the industrial robot. In the industrial robot control method of this type, a plurality of robot programs are stored beforehand in an internal memory of the robot control device, and a plurality of NC programs are stored beforehand in an internal memory of the numerical control device. The size or shape of a workpiece is sensed by a workpiece discriminating unit to select the robot program conforming to the particular workpiece, and an NC program number corresponding to this robot program is transmitted from the robot control device to the numerical control device to control the machine tool in accordance with the NC program having this number. By virtue of such an arrangement, the present invention dispenses with the need for loading an NC program or teaching a robot control program whenever a workpiece changes, thereby making possible both an improvement in system operating efficiency and in application to unmanned plants.

DESCRIPTION OF THE PREFERRED EMBODIMENTS

Figure 1:
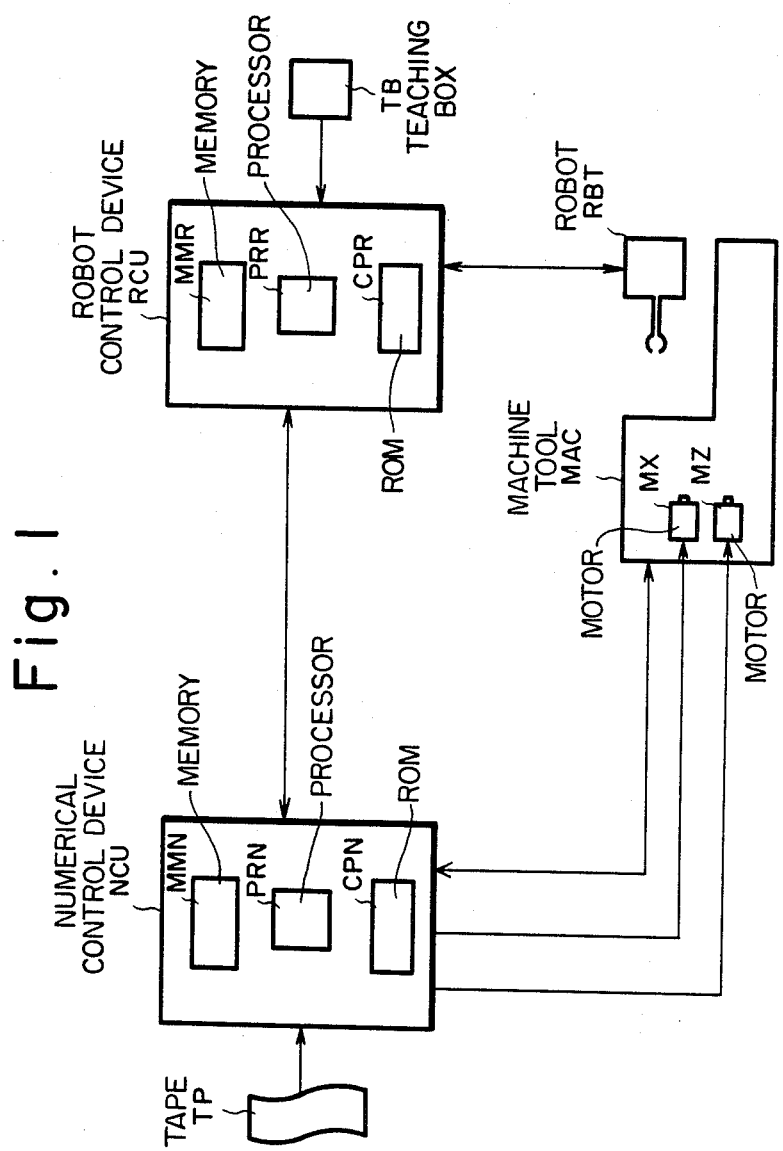
FIG. 1 is a block diagram of a robot system.
Figure 2:
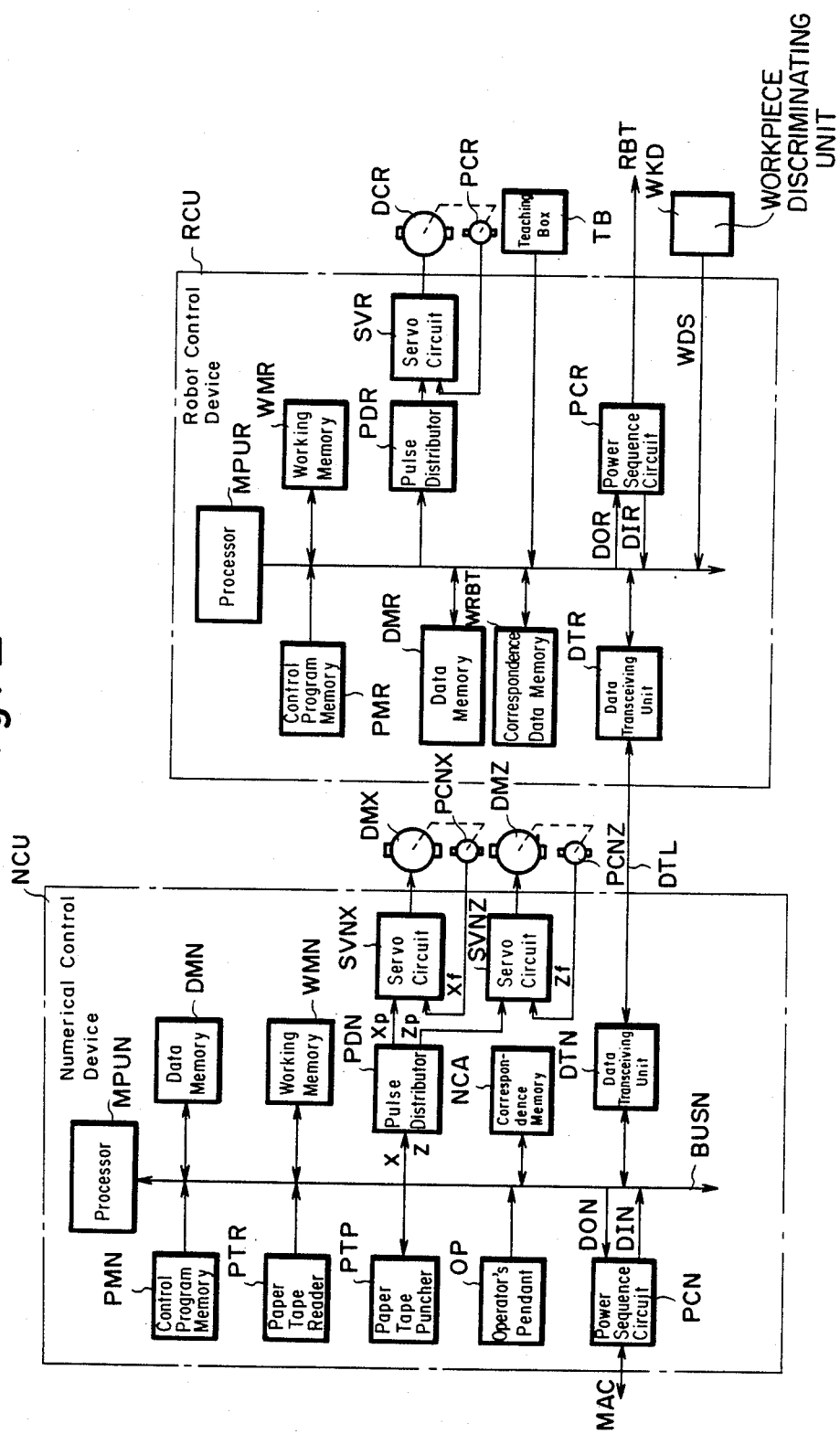
FIG. 2 is a block diagram of an embodiment used to perform the method of the present invention.

Referring to FIG. 2, NCU represents the numerical control device and RCU the robot control device. In the numerical control device, DMN designates a nonvolatile data memory for storing, internally of the numerical control device NCU, a number of machining programs for controlling a machine tool. WMN represents a working memory comprising a volatile RAM of low capacity for temporarily storing machining data read out of the non-volatile data memory DMN. PMN denotes a control program memory for storing a control program. Designated at MPUN is a processor, such as a microprocessor, for executing numerical control processing, editing processing, processing for the sending and receiving of data and various other forms of processing based on the control program and machining program. A correspondence table memory NCA stores the corresponding relationshp between an NC program number and the leading address at which the NC program having this number is stored in the data memory DMN. A pulse distributor PDN receives positional commands X, Z as inputs thereto and executes well-known pulse distribution computations to distribute pulses $X_p$, $Z_p$. SVNX, SVNZ denote servo circuits whose respective inputs are the distributed pulses $X_p$, $Z_p$ as well as feedback pulses $X_f$, $Z_f$ each of which is generated whenever motors are rotated by a predetermined amount, the servo circuits SVNX, SVNZ producing analog voltages proportional to $|X_p-X_f|$ and $|Z_p-Z_f|$, respectively. DMX, DMZ designate X-axis and Z-axis D.C. drive motors, respectively. Pulse coders PCNX, PCNZ are mounted on the respective shafts of the D.C. motors DMX, DMZ for generating the feedback pulses $X_f$, $Z_f$ whenever the corresponding motors rotate by a predetermined amount. It should be noted that the servo circuits SVNX, SVNZ, D.C. drive motors DMX, DMZ and pulse coders PCNX, PCNZ construct a servo unit which exercises servo control in such fashion that $|X_p-X_f|$ and $|Z_p-Z_f|$ both diminish to zero. PTR is a paper tape reader which reads an NC program (machining data) punched in the paper tape in order to load the NC program into the data memory DMN. A paper tape puncher PTP is adapted to punch an NC program, stored in the data memory DMN, into a paper tape serving as an external storage medium. OP represents an operator's pendant. DTN designates a data transceiving unit incorporating a shift register or the like for transmitting data to and receiving data from the robot control device RCU based on control executed by the processor MPUN. PCN represents a power sequence circuit for exchanging signals with a machine tool. Specifically, a signal DON indicative of, e.g., a miscellaneous function (M-function) instruction, a spindle rotation (S-function) instruction or a tool selection (T-function) instruction is delivered by the power sequence circuit to the machine side as a contact signal. When the machine side completes an activity in response to the miscellaneous function instruction, spindle rotation instruction or tool selection instruction, the machine issues a completion signal DIN on a bus line in the form of a contact signal. BUSN denotes a common bus over which the processor MPUN exchanges data with the other units. The common bus BUSN includes a data bus line and address bus line. DTL represents a a data transfer (or transmission) line which interconnects the numerical control device NCU and robut control device RCU so that data may be transferred between them.

In the robot control device RCU, DMR represents a nonvolatile data memory incorporated within the robot control device RCU, for storing a number of robot programs for controlling an industrial robot. WMR represents a working memory comprising a high-speed, volatile RAM of low capacity incorporated within the robot control device RCU. PMR denotes a control program memory for storing a control program. Designated at MPUR is a processor such as a microprocessor for executing, e.g., robot control processing and processing for the sending and receiving of data on the basis of a robot command program and the control program. A correspondence data memory WRBT stores corresponding relationships among workpiece type, robot program and the leading address at which the robot program is stored in the data memory DMR. WKD represents a workpiece discriminating unit for producing a workpiece discrimination signal WDS upon discriminating, e.g., the shape or size of a workpiece delivered by workpiece conveyance means such as a conveyor or the like (not shown). The processor MPUR goes to the correspondence data memory WRBT to find the robot program and leading address thereof corresponding to the workpiece discrimination signal WDS, and then selects the robot program from the data memory DMR.

Figure 3:
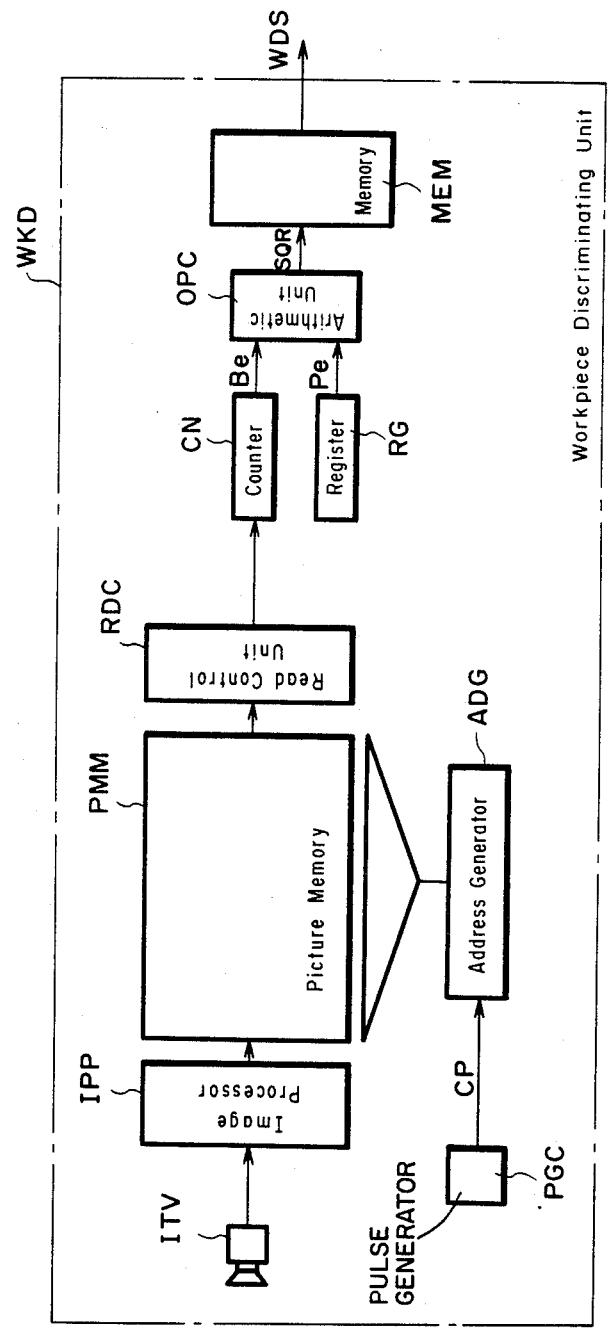
FIG. 3 is a block diagram of the workpiece discriminating unit used in the present invention and FIG. 4 is a block diagram of another embodiment used to perform the method of the present invention.

FIG. 3 is a block diagram of the workpiece discriminating unit WKD. ITV denotes a camera device for photographing workpieces carried on a workpiece feeder and for producing an image of each workpiece. An image processor IPP resolves single frames of the image produced by the camera device ITV into n x m picture elements, discriminates the brightness level of each picture element, and produces an output upon converting black level elements into "1" signals and white level elements into "0" signals. The 8- or 16-bit picture data produced by the image processor IPP are stored, item by item, at each address of a picture memory PMM. PGC denotes a pulse generator, and ADG an address generator which counts pulses generated by the pulse generator PGC to successively produce addresses for the picture memory PMM. At the time of an area computation, a read control unit RDC reads picture data in units of 8 or 16 bits from the particular address of the picture memory PMM designated by the address generator ADG, and delivers the data one bit at a time. The single bits of delivered picture data are applied to a counter CN which is incremented if the item of input data is a "1". Thus, the counter CN is incremented by one count each time a "1" is read, with the status of the counter eventually attaining a value of $B_e$. When all items of picture data comprising one frame are read out of the picture memory PMM, an arithmetic unit OPC computes an area ratio SQR by performing the following arithmetic operation:

$$SQR = (Be/Pe) \times 100 \ (\%)$$

using the total number Pe of picture elements in one frame, which number is stored in a register RG, and the number of black levels Be (number of workpiece picture elements) stored in the counter CN. The computed area ratio SQR is then applied to a memory MEM, which has stored therein the corresponding relationship between the area ratio and the workpiece, for producing the workpiece discrimination signal WDS conforming to the particular area ratio.

Returning to FIG. 2, PDR denotes a pulse distributor, SVR a servo circuit, DCR a D.C. motor for transportating a robot arm, and PCR a pulse coder. These components construct a servo unit which executes servo control in such a manner that the difference between the number of distributed pulses and the number of feedback pulses approaches zero, with the servo unit corresponding to that constituted by the aforementioned pulse distributor PDN, servo circuits SVNX, SVNZ, D.C. motors DMX, DMZ, and pulse coders PCNZX, PCNZ. DTR designates a data transceiving unit connected to the data transceiving unit DTN of the numerical control device NCU for mutual transmission and reception of data.

By way of example, let a desired robot program be selected by the operator or upon discrimination of workpiece size by means of the workpiece discriminating unit WKD. When this has been accomplished, an NC program number corresponding to the robot program is transferred to the numerical control device NCU via the data transmission line DTL. More specifically, since each robot program includes a corresponding NC program identification code which has been inserted into the program, the selection of a robot program causes an NC program identification code (the program number, for example) corresponding to the robot program to be transmitted to the processor MPUN of the numerical control device NCU through the data transceiving unit DTR, data transfer line DTL and data transceiving unit DTN, whereby the desired NC program is selected from among the plurality of NC programs.

Figure 4:
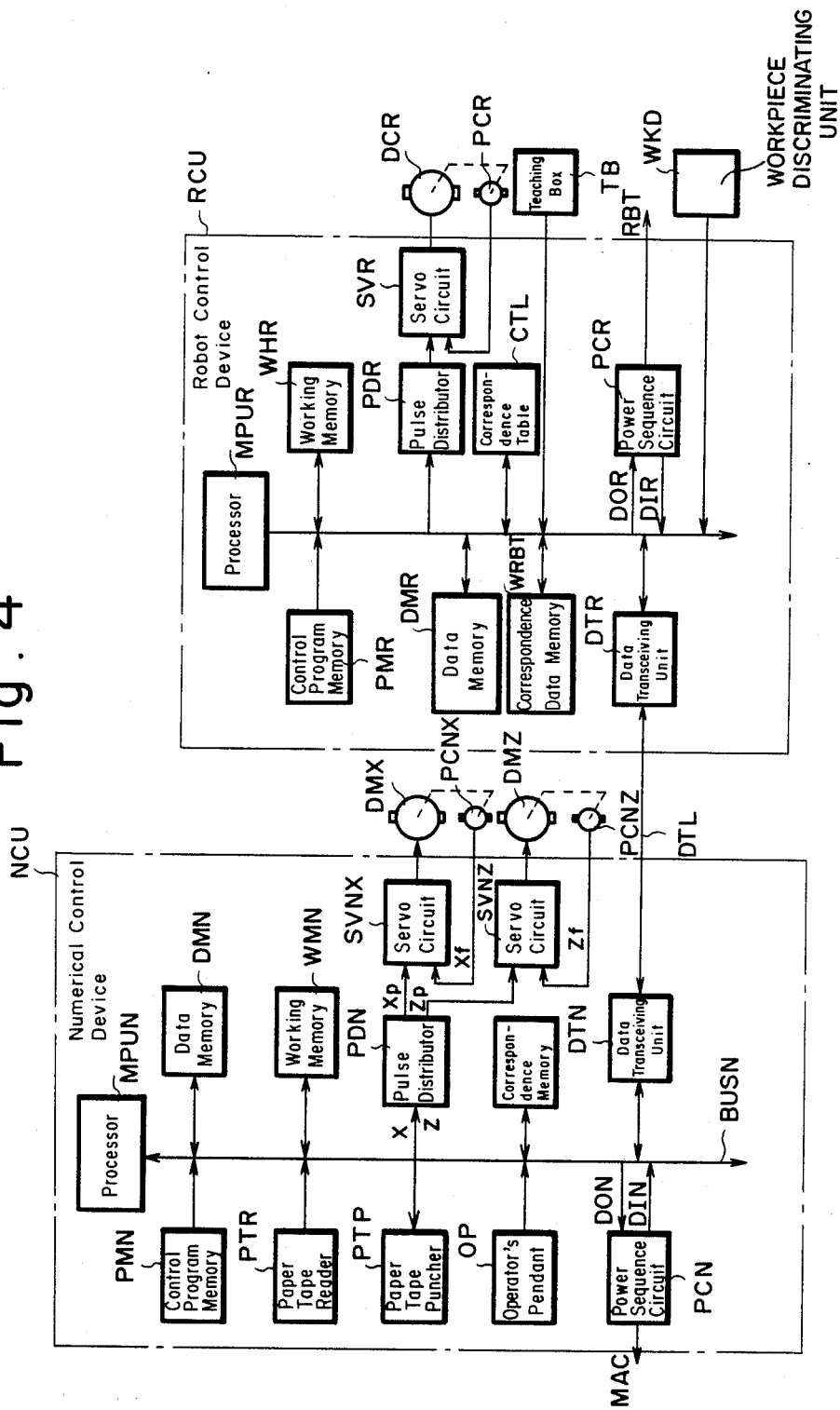

As an alternative to inserting an NC program identification code into the robot programs, an arrangement is possible wherein each robot program and NC program is assigned its own identification code in advance, and the corresponding relationships between the robot programs and NC programs are stored in memory using these identification codes. The predetermined NC program identification code is obtained by relying upon these stored corresponding relationships, and the code is delivered to the numerical control device NCU. FIG. 4 is a block diagram of an example of a system wherein the robot control device RCU is provided with a correspondence table CTL for storing the above mentioned corresponding relationships. TB denotes a teaching box for teaching robot motion and for loading robot programs into the data memory DMR. A robot program may be taught through the following procedure:

First, the robot is jog-fed up to a target position by means of a jog button provided on the teaching box TB, followed by setting a sequence number and an operating speed. Next, a robot hand or machine operation to be performed at the target position is designated by a robot service code, followed by depressing a teach button. When this is done, the sequence number, target position, operating speed and robot service code are stored in a predetermined area of the data memory DMR. The foregoing operations are then repeated to store a series of robot command data in the data memory DMR in the form of a robot program. PCR denotes a power sequence circuit for providing a robot RBT with a signal DOR, in the form of a contact signal, supplied by the processor MPUR for controlling each axis of the robot as well as the on/off operation of the robot hand. The power sequence circuit PCR also provides the processor MPUR with a signal DIR, such as a limit switch signal, indicating the end of motion along a respective robot axis or the end of an operation performed by the hand.

The operation of the present invention will be described next.

Prior to the start of operation, a plurality of machining programs are loaded into the data memory DMN via the paper tape and tape reader PTR, and a plurality of robot programs are loaded into data memory DMR from the teaching box TB by being taught throught the abovedescribed procedure. Also, the corresponding relationship among the kinds of workpieces, the robot programs and the leading addresses in the data memory DMR storing the robot programs, is loaded into the correspondence data memory WRBT. It should be noted that a corresponding NC program identification code (program number) is inserted in each of the robot programs beforehand at a suitable location thereof, such as at the beginning of the program.

When a workpiece arrives under these conditions, the workpiece discriminating unit WKD senses the size of the workpiece in the manner described above and produces the workpiece discrimination signal WDS. When the latter signal is read by the processor MPUR, the processor goes to the correspondence data memory WRBT to read out the leading address of the robot program corresponding to the workpiece discrimination signal WDS, and stores the address in a pointer (register) located within the working memory WMR. Next, the NC program identification code (program number) of the robot program is read out of the data memory DMR from the leading address designated by the pointer, and is read by the processor MPUN of the commercial control device NCU through the data transfer line DTL. The processor MPUN goes to the correspondence table memory NCA to obtain the leading address of the data memory DMN storing the NC program corresponding to the received program number, and stores the leading address in a pointer of the working memory WMN. Thus, through the foregoing operations, a robot program and an NC program corresponding to the particular workpiece, are selected, after which the NC program and robot program data are read successively block-by-block from the addresses designated by the pointers, so that the desired processing for machining and robot services may be executed.

The foregoing description relates to a case where workpieces of various shapes arrive in random fashion. However, if it is known that certain workpieces $W_1$ of number $N_1$ will arrive followed by workpieces $W_2$ of number $N_2$ and thereafter by workpieces $W_i$ of number $N_i$ ($i=3, 4 \ldots$), or in other words, if the schedule is known, then it is possible to adopt an arrangement wherein $N_i$ ($i=1,2, \ldots$) is set in advance and a subsequent NC program and robot program (both known) are selected each time $N_i$-number of workpieces are completed. In such case it will suffice to assign an NC program identification code to each robot program or to provide a correspondence table.

Thus, according to the present invention, a number of NC programs are stored in the numerical control device NCU and a number of robot programs are stored in the robot control device RCU making individual teaching and loading operations unnecessary, so that system efficiency can be enhanced. Moreover, the invention eliminates the need for operator intervention, making it possible to realize unmanned factories, since workpieces are discriminated automatically by sensing workpiece size and shape to enable the selection of a robot program and NC program corresponding to the workpiece.

We claim:

1. An industrial robot control method for use in a system having a machine tool, a numerical control device for controlling the machine tool under one of a plurality of NC programs, an industrial robot and a robot control device for controlling the industrial robot, comprising the steps of:

(a) storing the plurality of NC programs in the numerical control device;
(b) automatically generating an NC program selection signal under the control of the robot control device; and
(c) executing numerical control processing, under the control of the numerical control device, based on a selected one of the NC programs corresponding to the NC program selection signal.

2. An industrial robot control method according to claim 1, further comprising the steps of:
(d) storing a plurality of robot programs in the robot control device;
(e) inserting an NC program identification code into each of the robot programs prior to said step (d); and
(f) automatically selecting a predetermined robot program, wherein said step (b) comprises transmitting the NC program selection signal to the numerical control device to select the one of the NC programs corresponding to the selected robot program.

3. An industrial robot control method according to claim 1, further comprising the steps of:
(d) storing a plurality of robot programs in the robot control device;
(e) storing a correspondence table, indicating the correspondence between the robot programs and NC programs, in memory in advance;
(f) automatically selecting a predetermined robot program; and
(g) referring to the correspondence table to determine the NC program corresponding to the predetermined robot program selected in said step (f), wherein said step (b) comprises transmitting the NC program selection signal to the numerical control device to select the NC program corresponding to the selected robot program.

4. An industrial robot control method according to claim 3, further comprising the steps of:
(h) storing a corresponding relationship, between robot programs and the sizes of workpieces to be loaded or unloaded relative to a machine tool, in memory in advance;
(i) discriminating the sizes of the workpieces; and
(j) selecting a desired robot program based on the results of said discrimination step (i).

5. An industrial robot control method according to claim 3, further comprising the steps of:
(h) storing a corresponding relationship, between robot programs and the shapes of workpieces to be loaded or unloaded relative to a machine tool, in memory in advance;
(i) discriminating the shapes of the workpieces; and
(j) automatically selecting a desired robot program based on the results of said discrimination step (i).

6. An industrial robot control method according to claim 3, further comprising the steps of:

(h) storing a schedule, including the machining sequence of a plurality of workpieces and the number of workpieces to be machined, beforehand in an internal memory of the robot control device; and
(i) automatically selecting the robot programs based on the schedule stored in said step (h).

7. An industrial robot control method according to claim 2, further comprising the steps of:
(g) storing a corresponding relationship, between robot programs and the sizes of workpieces to be loaded or unloaded relative to a machine tool, in memory in advance;
(h) discriminating the sizes of the workpieces; and
(i) automatically selecting a desired robot program based on the results of said discrimination step (h).

8. An industrial robot control method according to claim 2, further comprising the steps of:
(g) storing a corresponding relationship, between robot programs and the shapes of workpieces to be loaded or unloaded relative to a machine tool, in memory in advance;
(h) discriminating the shapes of the workpieces; and
(i) automatically selecting a desired robot program based on the results of said discrimination step (h).

9. An industrial robot control method according to claim 2, further comprising the steps of:
(g) storing a schedule, including the machining sequence of a plurality of workpieces and the number of workpieces to be machined, beforehand in an internal memory of the robot control device; and
(h) automatically selecting the robot programs based on the schedule stored in the said step (g).

10. An industrial robot control method for use in a system having a machine tool for machining workpieces, a numerical control device for controlling the machine tool under one of a plurality of numerical control programs, an industrial robot and a robot control device for controlling the industrial robot under one of a plurality of robot control programs, comprising the steps of:
(a) storing the relationship between the workpieces, the NC programs, and the robot control programs, so that there is a stored correspondence between a workpiece of a particular size or shape, a predetermined NC program and a predetermined robot control program;
(b) determining the size or shape of the workpiece to be machined;
(c) automatically selecting the corresponding one of the robot control programs based on the results of said determining step (b);
(d) transmitting an NC program selection signal to the numerical control device in accordance with the selected robot control program, to select the corresponding NC program; and
(e) executing numerical control processing under the control of the numerical control device based on the selected one of the NC programs corresponding to the NC program selection signal.

* * * * *

UNITED STATES PATENT AND TRADEMARK OFFICE
CERTIFICATE OF CORRECTION

PATENT NO. : 4,549,276

DATED : OCTOBER 22, 1985

INVENTOR(S) : HAJIMU INABA ET AL.

It is certified that error appears in the above-identified patent and that said Letters Patent is hereby corrected as shown below:

Col. 5, line 37, "abovementioned" should be --above-mentioned--.

Col. 7, line 47, after "(j)" insert --automatically--.

Signed and Sealed this

Eighteenth Day of February 1986

[SEAL]

Attest:

DONALD J. QUIGG

Attesting Officer

Commissioner of Patents and Trademarks